April 6, 1937.  E. LUX ET AL  2,075,992
PRODUCTION OF COMPACT MOLDED BODIES FROM
CERAMIC MASSES, CONCRETE, OR THE LIKE
Filed Aug. 30, 1934  4 Sheets-Sheet 4
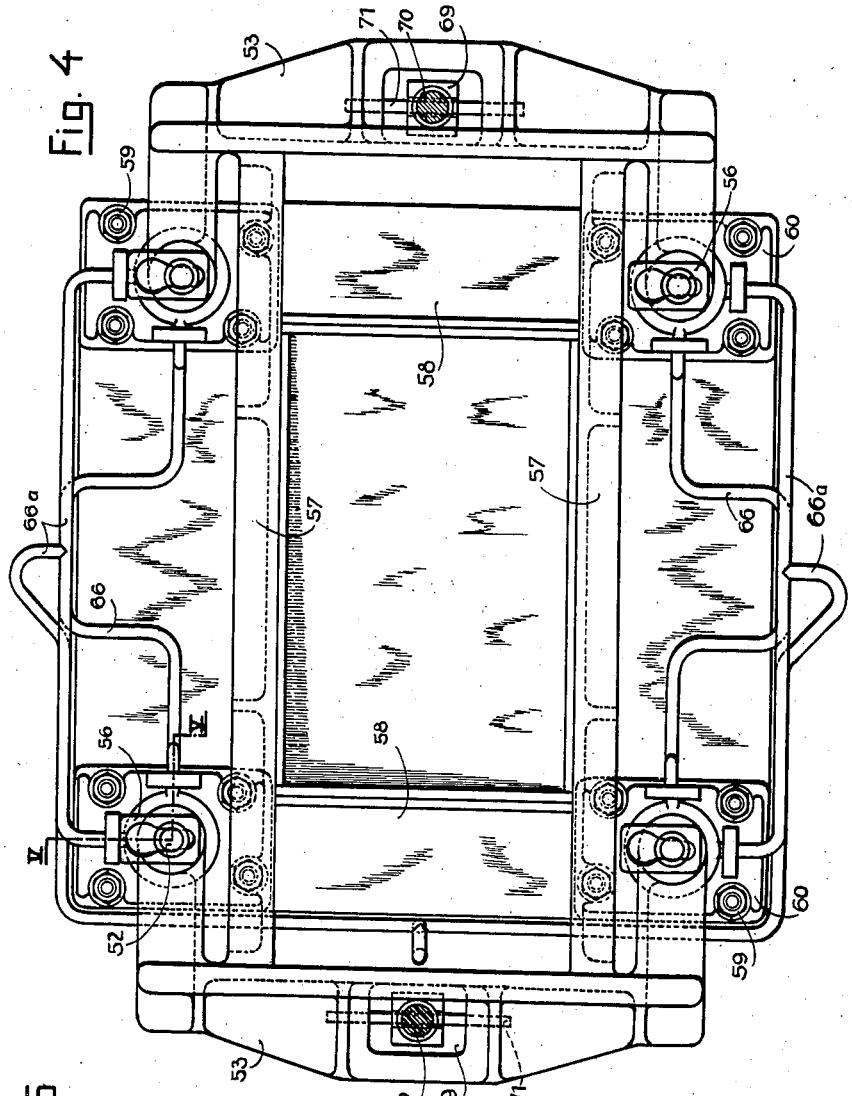
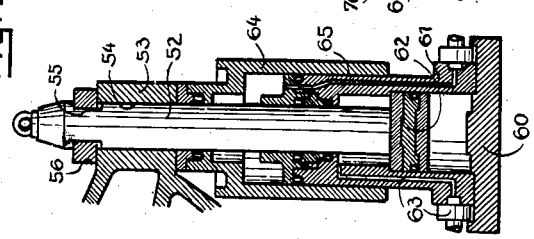
Inventors:
Elisabeth Lux.
Joseph Lamets Patented Apr. 6, 1937

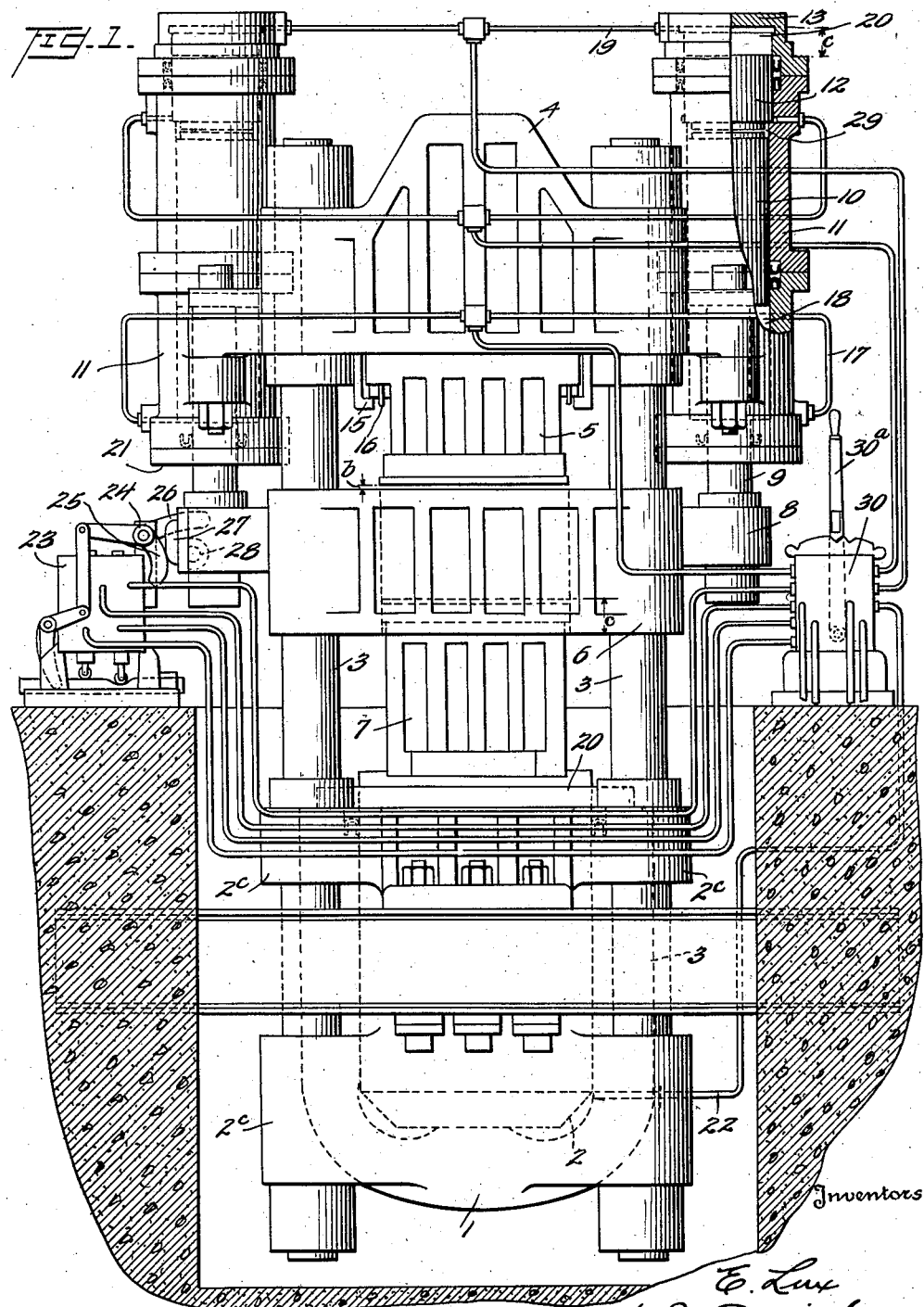

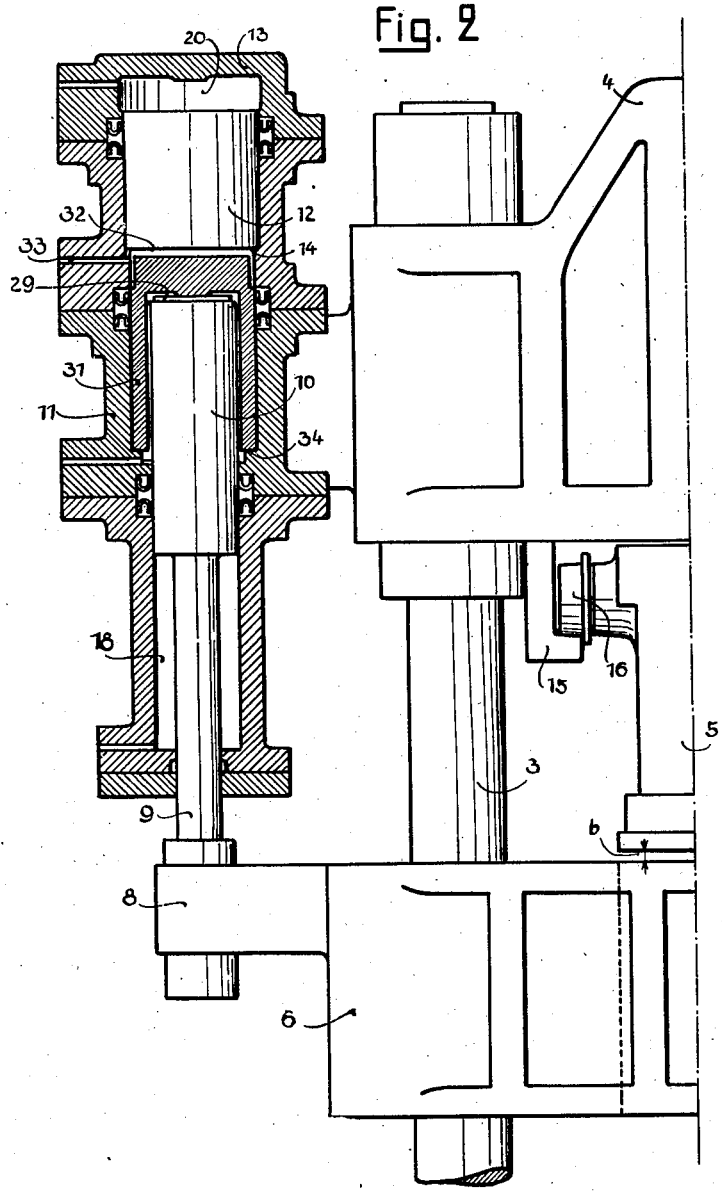

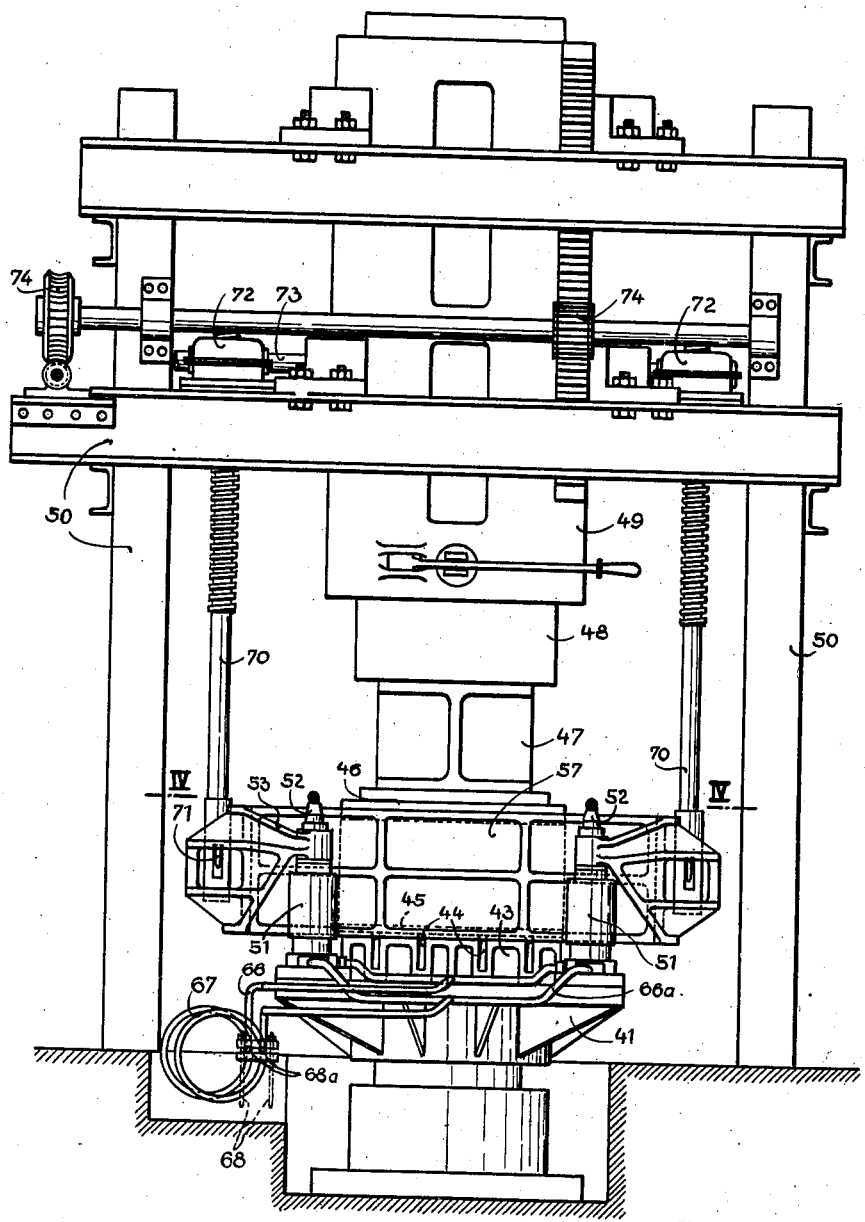

2,075,992

UNITED STATES PATENT OFFICE 2,075,992

PRODUCTION OF COMPACT MOLDED BODIES FROM CERAMIC MASSES, CONCRETE OR THE LIKE

Elisabeth Lux, Dusseldorf-Heerdt, and Joseph Daniels, Essen-Ruhr, Germany

Application August 30, 1934, Serial No. 742,192
In Germany August 31, 1933

4 Claims. (Cl. 25—56)

The invention relates to the production of molded bodies from ceramic masses, concrete or the like whilst using a mold in which the mass is compressed by one or more loaded plungers, and particularly to the production of the molded bodies with the use of a mold which during the pressing or other compressing operation is movable parallel to the direction of movement of the loaded plunger. By "loaded plungers" is meant plungers to which pressure is applied in known manner.

The main object of the present invention is to provide such improvements in the said devices for the production of molded bodies and from ceramic masses, concrete or the like, by which a more far reaching compacting of the masses or the production of denser molded bodies is possible than hitherto.

Further objects of our invention will appear from the following description of our invention.

It is well known that in the production of molded bodies from ceramic masses and the like by means of hydraulic presses and similar devices the molded mass is compressed more highly in the vicinity of the press plunger than in the remaining parts of the mold hollow. In order to obtain a uniform compressing of the molded masses it has been suggested to render the mold side walls movable relatively to the press plunger and to the mold bottom parallel to the pressing direction, during the pressing operation. In this manner there is obtained in the vicinity of the mold bottom the same or substantially the same compactness as in the vicinity of the press plunger. Nevertheless, the compression of the mass in the middle layers of the molded body remains unsatisfactory and, generally, it is not possible to effect the compression sufficiently uniformly at the top and bottom sides, that is to say, in the vicinity of the press plunger and mold bottom.

The fundamental solution of the problem, discovered by us, to produce a mold body which is practically uniform in all parts, resides in providing a mold, movable relatively to the press plunger and the mold bottom, with such means that the mold can be moved during the pressing operation, optionally, either in the direction of the press plunger or of the mold bottom. Within the scope of our invention it is naturally also possible to use a second press plunger instead of the mold box bottom.

We will now explain the nature of our present invention with particular reference to the embodiments thereof shown in the drawings.

In the drawings, Fig. 1 shows a hydraulic press constructed according to our invention, in side elevation and partial vertical longitudinal section.

Fig. 2 shows, on a larger scale, another embodiment of the moving device for the mold in a press otherwise constructed as in Fig. 1.

Fig. 3 shows the invention as applied to a jigging or vibrating molding machine, which is shown in side elevation.

Fig. 4 shows a horizontal cross section of the machine according to Fig. 3 on the line IV—IV of Fig. 3.

Finally, Fig. 5 shows, on a larger scale, a vertical longitudinal section of the moving device for the mold side walls of the machine according to Figs. 3 and 4.

The press device shown in Fig. 1 of the drawings consists of a press cylinder casing 1, which has lateral projections 2c on which are provided the columns 3 for the crosshead 4 for a counter plunger 5 immovable in the pressing direction.

On the columns 3 of the press frame the mold 6 is mounted for vertical movement, the hollow of the mold being open at the top and bottom.

In the cylinder casing 1, is mounted the press cylinder 2 which at the top carries the press plunger 7 of which the cross section corresponds with that of the mold hollow. In a similar manner the cross section of the counter pressure plunger 5 corresponds with the mold hollow so that the press plunger 7 and the counter pressure plunger 5 may engage to a suitable depth in the mold 6.

The mold 6 is provided with lateral extensions 8 which engage piston rods 9 each of which is rigidly connected to a piston 10 which is mounted in a cylinder 11 provided on the crosshead 4.

The piston rods 9 and pistons 10 are so constructed that the piston can be moved up and down by water under pressure.

Above the pistons 10 there are provided, in enlarged portions 13 of the cylinders 11, loose pistons 12 and which are movable up and down and are so constructed that they can bear with their lower ends, as shown in the drawings, against the tops of the pistons 10. The downward movement of the pistons 12 is limited by the shoulders 14 of the cylinders 11.

In order to enable the mold 6 to be filled conveniently with the material to be compressed the counter pressure piston 5 is made transversely movable on the crosshead 4. For this purpose the crosshead 4, carries on its underside two running tracks 15 on which the counter pressure piston rests and is laterally movable through the medium of rollers 16.

Further essential parts of the press device shown in the drawings will appear from the following description of the method of operation of the press.

In the drawings the press is shown in a position in which the press piston 2 is in its lower end position and the press mold 6 has been raised, by means of the piston 10, into such a position that the upper edge of the press plunger 7 still just engages with the mold hollow, whilst the counter pressure plunger 5 is outside the mold hollow and at a distance b from the mold upper edge thereof. In order to bring the mold into this position water under pressure is supplied through the pipe 17 into the cylinder chamber 18 underneath the pistons 10. At the same time water under pressure is supplied by the pipe 19 into the cylinder chamber 20 of the pistons 12 until the pistons 12 bear firmly against the shoulders 14. As the pistons 12 have a larger cross section than the lower surface of the pistons 10 the pistons 12 act as a limit for the upward movement of the pistons 10. The shoulders 14 are so arranged relatively to the counter pressure plunger 5 that when the pistons 10 bear against the pistons 12 seated on the shoulders 14 the mold is just at the distance b from the underside of the counter pressure plunger 5.

After the mold has been moved into the upper position determined by the pistons 12, the counter pressure plunger 5 is moved laterally and the molding mass is now charged into the mold hollow. Preferably the molding mass is distributed as uniformly as possible in the mold and levelled before carrying out the pressing.

As soon as the charging of the mold has been completed the counter pressure plunger 5 is moved into the pressing position in which it lies accurately in the path of the mold.

The cylinder chambers 20 of the pistons 12 are now set to exhaust and water under pressure is conducted uniformly into the lower cylinder chambers 18 of the pistons 10 so that the mold 6 moves somewhat upwardly through the distance c until the projections 8 of the mold 6 come to bear against the lower side 21 of the cylinder casings 11. This position of the mold is its upper end position.

Thereupon water under pressure is conducted by the pipe 22 into the cylinder chamber below the press piston 2, whereby the press piston 2, and the press plunger 7 provided thereon, are moved upwardly. The mass located in the mold is now compressed between the plungers 5 and 7 which, as will be understood, both projected into the mold hollow before the commencement of the movements of the press plunger 7.

As soon as the pressing by means of the piston 2 and press plunger 7 commences, a control device 23, provided laterally of the press, is set in action. This control device 23 is provided with a control lever 24 which has two arms 25 and 26.

These arms 25 and 26 of the control lever are located in the path of two control cams 27, 28 provided on one of the extensions 8 of the mold.

The method of operation of the control device 23 is as follows.

After the compression of the mass has commenced, and the press mold is located in its upper end position, that is to say, the projections 8 bear against the lower side 21 of the cylinders 11, water under pressure is supplied to the cylinder chambers 29 above the pistons 10. The pistons 10 then move downwards and with them the mold 6. As soon as the projection 27 of the mold comes within reach of the control lever projection 25 and acts against this the control device 23 is reversed by the control lever 24 in such a manner that now the chambers 29 above the pistons 10 are set to exhaust whilst the chambers 18 below the pistons 10 are connected to water under pressure. Consequently the pistons 10 and the mold move upwardly. During the upward movement of the mold the stop 28 comes within reach of the control lever projection 26, the control lever 24 is thus again changed over and the control device 23 is brought into the same position as before, i. e. water under pressure is conducted into the cylinder chambers 29 above the pistons 10 and the chambers 18 under the pistons are set at exhaust. As soon as the stop 27 then again comes within reach of the control lever projection 25 the control device is again changed over. The mold now again moves upwards and this up and down movement of the mold is repeated until the control device 25 is set out of operation.

During the up and down movement of the mold the press plunger 7 remains loaded, that is to say, the cylinder chamber 2 remains continuously connected to the pipe for water under pressure.

For controlling the press piston and the movements of the pistons 10 and 12 before effecting the pressing there is provided a control device 30 having a hand setting lever 30a. The device 30 is connected by suitable pipes, according to the method of operation of the press herein described, to the separate hydraulic cylinders on the one hand and to the control device 23.

The control device 30 also serves to stop the entire press. It may also be used to carry out the movements of the mold during pressing in a different manner than that which corresponds with the setting of the control device 23.

As soon as the pressing has been completed the control device 30 is changed over in such a manner that water under pressure passes into the cylinder chambers 29 of the pistons 10 until the mold 6 is moved downwards completely over the molded product and the molded product is freely accessible from all sides.

The molded product is then removed from the press plunger 7, for example on to a roller track or the like brought to the side of the press plunger 7. The mold 6 is then moved into the filling position by passing water under pressure into the chambers 18 of the pistons 10, whereupon the press is ready for a fresh molding operation.

In order that no disturbance occurs in the control device 23 during the downward movement of the mold for the purpose of removing the molded product the control device is disengaged automatically during this time by the main control device 30.

It may be mentioned that the projections 25 and 26 of the control lever 24 are secured adjustably to the latter. Instead of this the stops 27 and 28 may be arranged adjustably. In this manner it is possible to effect any desired automatic up and down movement of the mold during the pressing operation. The speed of up and down movement of the mold, as also the speed of the press piston 2 is regulated by adjustable throttle valves in the controls of the device.

In Fig. 2 is shown another embodiment of the moving device for the mold 6. This moving device is so constructed that the mold at the commencement of the pressing operation is moved at the same speed as the press piston. For this purpose a hooded piston 31 surrounds the piston 10 of the piston rod 9 connected to the mold extensions 8, the hollow interior of piston 31 forming preferably a cylinder for the piston 10. The cylinder chamber 32 above the hooded piston 31 is provided with a separate pipe 33 for water under pressure. Above the cylinder chamber 32 there is also located the limiting piston 12 provided in the embodiment in Fig. 1. For the hooded piston 31 there is further provided in the cylinder casing of the moving device a stop 34 by which the downward movement of the piston 31 is limited.

The various stops of the pistons 31 and 12 and the distance of these pistons from these stops is so selected that in the lower end position of the hooded piston 31, which is obtained by forcing water under pressure into the cylinder chamber 32, the mold 6 is located in the filling position. In this position the mold 6, as above described, is spaced from the counter pressure plunger 5 by the distance b so that the counter pressure piston 5 can be moved laterally.

As soon as the mold has been filled water is let out of the cylinder chambers 32, whilst the pipe for water under pressure remains connected to the cylinder chambers 20 of the pistons 12. At the same time water under pressure is supplied to the cylinder chambers 18 of the pistons 10. The pistons 10 are now together with the hooded pistons 31 moved upwardly to such an extent that the pistons 31 bear against the pistons 12. The mold 6 then makes such an upward movement that the counter pressure plunger 5 just engages with the mold hollow and closes this.

The press device is now ready for the actual pressing operation i. e. the press piston 2 can now be moved upwardly with the press plunger 7. Simultaneously with the inflow of water under pressure into the cylinder chamber of the piston 2 the cylinder chambers 20 are relieved and water under pressure supplied to the cylinder chambers 18. The press plunger 7 and the mold 6 are thus moved upwardly, in contrast with the embodiment in Fig. 1 in which the mold 6 was moved downwardly during the first upward movement of the press plunger 7.

The remaining movements of the press plunger 7 and mold 6 in the embodiment in Fig. 2 are similar to the method of operation of the embodiment in Fig. 1.

It may finally be mentioned that the downward movement of the press piston 2 and of the press plunger 7 connected thereto is produced by setting the cylinder chamber of the piston 2 to exhaust and the relieved piston 2 is now pressed downwardly by the pistons 10.

The dimensioning of the pressure outputs of the various hydraulic devices for moving the mold may be such that the mold can also be moved by the friction of the molding mass upon the mold side walls, the value of such friction depending upon the maximum pressure of the press piston 7.

There will now be described the device shown in Figs. 3 to 5, which show the application of our present invention to a vibrating molding machine.

In the device shown in Figs. 3 to 5 of the drawings 41 indicates the vibrating molding table secured to the usual vibrating device 42. To the vibrating table 41 is secured the mold bottom 43 which is provided with a series of slots 44 open at the top. During the vibrating operation a supporting plate 45 rests on the mold bottom. After the completion of the molding operation suitable supporting arms of a lifting device are inserted in the slots for raising the completed molded product, together with the supporting plate 45, from the mold bottom.

Above the mold bottom is provided a press plate 46, serving to load the molding mass during the pressing operation, which is rigidly connected by means of a member 47 to a weight body 48 which is mounted for free vertical movement in a sliding track 49 of the frame 50. On the machine frame 50 there are also provided devices, not shown in the drawings, for lifting the weight body 48 together with the press plate 46 after the completion of the pressing operation for the purpose of removing the molded product.

On the piston rods 52 of two adjacent hydraulic devices 51 are seated U-shaped frames 53 of which the limbs are provided at the end with bores which are fitted over the projecting ends of the piston rods 52. As shown in Fig. 5, the piston rods 52 are provided at their ends with recesses 55 for engagement with (as shown in Fig. 4), locking members 56, which serve to secure the frames 53 to the pistons 52 of the hydraulic devices. To the frames 53 are secured, by means of bolts or in any other suitable manner, the longitudinal side walls 57 of the mold, the bolt holes being so arranged that the longitudinal side walls can be secured to the frame 53 at various distances apart, according to the desired size of the molded product to be produced. The side walls 57 carry the transverse walls 58 of the mold, of which the length also depends on the dimensions of the molded products to be produced. All the side walls of the mold are connected to the hydraulic lifting and lowering devices 51 by means of the supporting frames 53.

The hydraulic devices for moving the mold side walls consist of a base plate 60, secured to the vibrating mold table by means of bolts 59, to each of which is secured a cylinder 61. Each cylinder 61 surrounds a piston 62 on which is seated the piston rod 52 leading to the supporting frame 53. The piston rod passes through the end wall of the cylinder 61. Into the space between the piston 62 and the end wall of the cylinder 61 leads a pipe 63 which serves to supply water under pressure for the downward movement of the piston rod 52 and mold side walls.

The outer surface of the cylinder 61 is formed as a piston surface. It is surrounded by a cylinder 64 of which the end surface is also traversed by the piston rod 52. The cylinder 61 bears with its upper end against the limb end of the supporting frame 53 seated on the piston 52. The hollow of the cylinder 64 has water under pressure supplied thereto by the pipe 65. The cylinder 64 thus serves to raise the supporting frame and thus the mold side walls.

From the foregoing it will be seen that the pistons 62 and the cylinders 64 can be moved independently of one another. It is thus possible on the one hand to clamp the supporting frame 53 firmly on the piston rod 52 between the locking device 56 and the cylinder 64, and on the other hand to release the clamping on the piston rod 52 for the purpose of removing the supporting frame. The separate movability of the lifting and lowering device also enables the supporting frame 53 to be connected immovably to the vibrating table 41 during any phase of the operation so that the supporting frame 53 and the mold side walls secured thereto can always accurately follow the vibrating movements of the molding tables.

All the hydraulic devices 51 are so connected together by suitable pipes 66 and 66a that the pressure of the water is always the same in all lifting devices, so that a uniform raising and lowering of the mold side walls on to the table 41 is rendered possible.

The supply pipes for water under pressure for the table are connected laterally of the table to two freely suspended pipe coils 67 of which the other end is connected to the fixed pipes 68 so that the supply of water under pressure is possible both to the lifting and lowering devices during the movement of the vibrating table. The pipes 68a lead to a control, not shown in the drawings, which is so constructed that at any time the inlet to the lifting and lowering devices is under pressure, on the one hand, the outlet for the charge from the device to be relieved, for the purpose of moving the mold side walls, is throttled on the other hand. In this manner a premature outflow of the charge from one of the cylinders, and thus a loosening of the mold side walls on the piston rods 52 of the hydraulic devices, is prevented.

In order to remove the molded product from the molding device after the completion of the molding operation the lifting and lowering devices 51 are first relieved, whereupon the locking members 56 are removed from the piston rods 52. The ends of screw spindles 70, secured to the supporting frame by means of wedges 71, are now lowered from above into the recesses 69 of the supporting frames 53. The screw spindles 70 are seated in driving mechanisms 72 secured to the crosshead of the machine frame 50. The driving mechanisms 72 are so driven by a common shaft 73 that the supporting frames 53 and thus the mold side walls are withdrawn upwardly from the molded products. During the removal of the mold side walls the press plate 46 remains lying on the molded product. As soon as the side walls have been raised the press plate 46 is also removed from the molded product by means of the lifting device 74 and then the molded product is removed from the mold bottom in the manner above described.

The method and the device according to the present invention are applicable to the treatment of practically all molded masses adapted to be compressed by pressing or shaking, particularly ceramic molding masses, and is used with advantage in all cases where high compactness and homogeneity of a molded product are of particular importance. The method according to the present invention has been found particularly suitable for the production of molded products for the manufacture of glass trough blocks the durability of which depends substantially on low porosity and uniform constitution.

We claim:

1. Device for the production of molded bodies from ceramic masses, concrete or the like comprising a mold open on two oppositely disposed sides, plungers so arranged and constructed that the mass charged into the mold hollow is pressed together by means of the plungers, and means for effecting positive up and down movement of the mold during the compressing operation.

2. Device for the production of molded bodies from ceramic masses, concrete or the like, comprising a mold open on two oppositely disposed sides, plungers so arranged and constructed that the mass charged into the mold hollow is pressed together by means of the plungers, and hydraulic devices firmly mounted on the one hand and on the other hand connected to the mold, said hydraulic devices being so constructed and arranged that by means thereof the mold is moved positively along the material being pressed and during the pressing operation.

3. Device for the production of molded bodies from ceramic masses, concrete or the like comprising a vibrating molding machine the mold bottom being provided on the vibrating table, and means to which the mold side walls are secured, said means being so arranged and constructed that by means thereof the mold side walls are raised and lowered during the vibrating movements, and a weight loaded plunger resting loosely on the top side of the mass charged into the mold whilst closing the mold hollow, and having a sliding fit within said mold walls.

4. A device for the production of molded bodies from ceramic masses, concrete or the like, comprising a mold open on two oppositely disposed sides, plungers arranged at opposite sides of the mold, means for applying pressure to at least one of said plungers for pressing material within the mold and between said plungers, power means for positively moving the mold along the material being pressed, and during pressing thereof, control means for causing said power means automatically to effect such movement of the mold, and additional control means for causing said power means to lower the mold and thus expose the molded article for removal from the device.

ELISABETH LUX.
JOSEPH DANIELS.